United States Patent [19]

Tiltscher

[11] 4,325,130

[45] Apr. 13, 1982

[54] REPROGRAMMABLE CONTROL APPARATUS

[75] Inventor: Gerald Tiltscher, Burlafingen, Fed. Rep. of Germany

[73] Assignee: Mannesmann Aktiengesellschaft, Duesseldorf, Fed. Rep. of Germany

[21] Appl. No.: 128,482

[22] Filed: Mar. 10, 1980

[30] Foreign Application Priority Data

Mar. 16, 1979 [DE] Fed. Rep. of Germany ....... 2910891

[51] Int. Cl.³ .............................................. G06F 9/00
[52] U.S. Cl. ................................................... 364/900
[58] Field of Search .................... 307/458, 563, 317 A; 364/200 MS File, 900 MS File

[56] References Cited

U.S. PATENT DOCUMENTS 3,562,549  2/1971  Teichman ........................... 307/458
4,161,760  7/1979  Valentine ......................... 307/317 A

OTHER PUBLICATIONS

"*ROM Can Be Electrically Programmed and Reprogrammed and Reprogrammed*", Frohman-Bentchkowsky, McGraw Hill-1974, pp. 140-144.
"*Build A $20 EPROM Programmer*", Laabs, Kilobaud, The Small Computer Magazine, Issue #9, Sep. 1977, pp. 70-74.
*Microprocessors and Programmed Logic*, Short-Prentice Hall Inc., 1981, pp. 56-62.
*Intel Memory Design Book*, Intel Corp., Santa Clara, Ca.-1977, pp. 8*i*, 8*ii*, 8'-8-13, 9*i* and 9-1 through 9-13.

*Primary Examiner*—Harvey E. Springborn
*Attorney, Agent, or Firm*—Smyth, Pavitt, Siegemund & Martella

[57] ABSTRACT

An electrically programmable and erasable ROM (EPROM) is accessed via a selector and an address counter, all mounted on a PC board which includes also a regular VCC bus. The EPROM output lines feed an output circuit, parts of which may be on other boards. The board, however, has additional terminals connected to the EPROM output lines in addition to a protective circuit limiting the voltage level in the output circuit in case high reprogramming signals are applied by an external unit to some of these additional terminals for programming via the EPROM output terminal. One of the latter terminals connects to the VCC input of the EPROM and a Schottky diode connects the VCC bus to that input to protect the latter bus from a higher-than-normal supply voltage needed during reprogramming.

4 Claims, 1 Drawing Figure

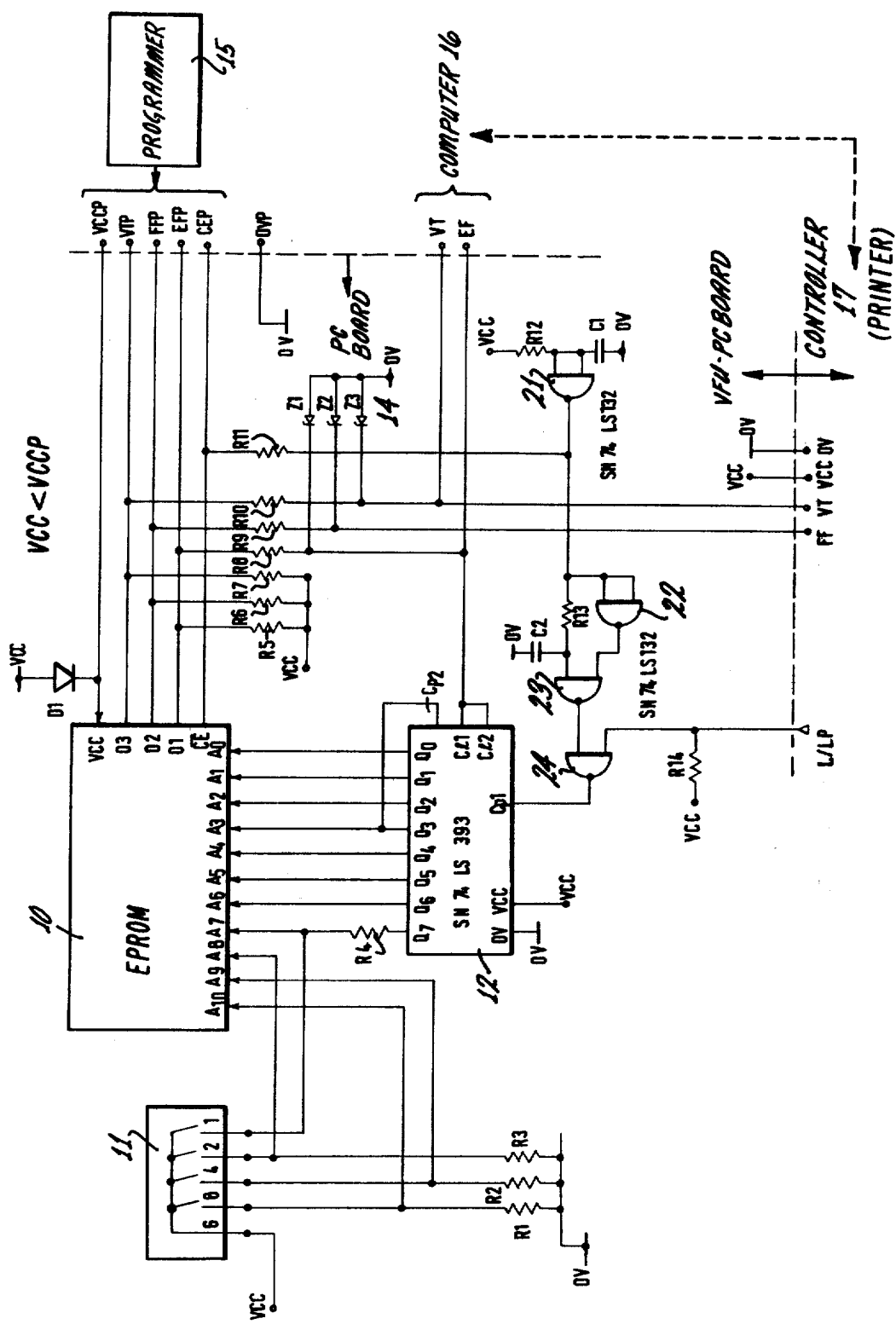

REPROGRAMMABLE CONTROL APPARATUS

BACKGROUND OF THE INVENTION

The present invention relates to an electronic control apparatus, cooperating, for instance, with a stepwise operating machine, device, or the like, which performs sequences of step on a programmed basis.

The control apparatus, in accordance with the invention, is particularly destined and designed to cooperate with a selection switch for program selection, and each of the selectable and selected programs is contained in a PROM, preferably being of the electrically programmable and erasable variety, also called EPROM, sometimes called EAROM. Program control on the basis of PROM's or E-PROM's is used to an increasing extent in many fields of application. Utilization of PROM's (rather than ROM's) is advisable in those cases in which one or the other, some, or even all, programs may have to be changed, extended, augmented, modified, replaced, etc.

In practice, it was found necessary to take the PROM physically out of the circuit in order to achieve the reprogramming, or the like. The basic reason here is to be seen in the fact that rewriting the content of a PROM requires higher than normal operating voltages. This reprogramming voltage, if effective in regular circuit elements, would readily destroy them.

Usually, a PROM is one of several IC elements on a PC board. The removability requires that a socket be affixed to that board, and the IC-PROM is simply plugged in or taken out. This appears to be a simple enough procedure; but in practice, it was found that untrained personnel may damage this part or others, or plug the PROM back in the wrong orientation. Thus, the approach to the problem of reprogramming, namely, the removable mounting of the PROM on the PC board, and providing for external reprogramming of the removed PROM, is not a satisfactory one.

DESCRIPTION OF THE INVENTION

It is an object of the present invention to program or reprogram a an electrically programmable ROM in situ, i.e., without requiring its removal from the circuit with which the programmed PROM will cooperate; the EPROM should thus be permitted to be unremovably hard-wired (solder connection) to a PC board.

It is another object of the present invention to provide a new and improved circuit for an EPROM, which circuit includes terminals for connection to a reprogramming structure.

It is a particular object of the present invention to provide a new and improved, programmable program control for the stepwise advance of a paper-feed control drive in printers.

It is a specific object of the present invention to improve a control apparatus which includes a an electrically programmable and erasable ROM (EPROM), circuitry for addressing and accessing the EPROM, and output circuitry into which data are fed, such as program information and which can be read out from addressed and accessed locations of the PROM; the circuit connection between these parts includes a supply bus for providing normal, regular operating voltage and power to the PROM and the addressing circuit.

In accordance with the preferred embodiment, the apparatus as per the specific object is supplemented by particular terminals, not to be used for regular operation but for plug-in of a programming or reprogramming unit which furnishes the data to be stored in the EPROM. These terminals are connected to the EPROM in addition to the regular output circuit; one of these particular terminals connects to the voltage supply input of the EPROM, other particular terminals connect to the output terminals of the PROM. A protective circuit is connected to the PROM output circuitry and the other particular terminals to limit the voltage level in the output circuit whenever higher-than-normal voltages are applied to the particular terminals to be effective in the PROM. The regular supply bus is connected to the supply input of the PROM via a Schottky bias in forward connection; a higher than normal supply voltage, when applied to the one particular terminal, can reach the PROM, but not the normal supply bus; that higher voltage reverse-biases the Schottky diode. In the preferred form, the protective circuit includes Zener diodes and resistors, so that the output circuit is always connected to the PROM data output via these resistors.

It was found that the programming or reprogramming can be carried out without skilled intervention. The programming unit is plugged into these additional terminals which are not used otherwise, and programming and reprogramming does not require disconnecting the PROM from other circuitry with which the PROM normally cooperates. The programming unit will then provide for the requisite program operation without delay. Incorrect mounting, danger of damaging the PROM, etc., all that is avoided.

DESCRIPTION OF THE DRAWING

While the specification concludes with claims, particularly pointing out and distinctly claiming the subject matter which is regarded as the invention, it is believed that the invention, the objects and features of the invention, and further objects, features, and advantages thereof, will be better understood from the following description taken in connection with the accompanying drawings, in which:

The FIGURE is a block and circuit diagram of a control apparatus, improved upon in accordance with the preferred embodiment of the invention and constituting an example of practicing the best mode thereof.

DESCRIPTION OF THE PREFERRED EMBODIMENT

The FIGURE shows, in particular, a Vertical Form Unit, or VFU for short, which cooperates with a print controller 17 as well as a computer 16. The computer furnishes the line-formatted data to be printed, to the controller which, in turn, controls the printing process both, as to printing proper and vertical paper feed advance. Printing may occur on different forms, differing, for example, in length, skip space, etc. The VFU unit, in particular, adapts the printing process to different forms which can be selected by a selector or selection switch 11, and the relevant control data for the print controller are programmed into a PROM 10. This PROM and associated circuitry is mounted on a PC board, whereby particularly the PROM is hard-wired to that board.

The PROM has eleven address input terminals $A_0$ through $A_{10}$ for an address continuum of 2048. Each addressable location has three bit positions, connectable to Terminals 01, 02, and 03. These terminals are normally output terminals from which a 3-bit "word" can be taken which has been read from an addressed location. However, Terminals 01, 02, and 03 can also serve as input terminals for higher voltage level signals when applied thereto from the outside. Typically, the normal operating voltage of PROM Chip 10 may be approximately 5 volts, data read in and reprogramming requires the application of 8.75 volts for VCC and 17 volts for direct storage control and content override.

In addition, PROM 10 has the usual VCC terminals as well as a chip enabling terminal CE. Program readout as well as reprogramming requires the input to this terminal to be high.

The four high-order address terminals $A_7$, $A_8$, $A_9$, and $A_{10}$ are connected to the four binary output terminals 1, 2, 4, and 8 of the selection switch 11. One can also say that sixteen select positions of that switch provide a hexa-decimal output. The VCC voltage is also the operating voltage for this selection switch.

Ground potential is applied to the PROM via one or more of resistors R1, R2, and R3, provided selector 11 has not connected all of terminals 2, 4, and 8 to the three high-order address bit terminals of PROM. This then restricts the selection to fourteen operative positions. If a PROM is used with separate ground input, this restriction does not apply.

The low-order bit position of selector 11 is connected to terminal $A_7$, but there is an additional connection to resistor R4; the purpose of this connection will become apparent shortly.

The low-order bit position terminals $A_0$ to $A_7$ of PROM 10 are connected to the output terminals $Q_0$, $Q_1$, $Q_2$, $Q_3$, $Q_4$, $Q_5$, $Q_6$, and $Q_7$ of an eight-bit counter 12. The counter may be of the type traded under the designation SN 74 LS 393. The counter has the usual VCC and ground terminals, a clock input $C_{Pl}$ and clear inputs Cl1 and Cl2, being tied together in this example.

The fact that the lowest position selector bit and the highest position counter bit are both applied to the same PROM address terminal, $A_7$, simply means that even-number selections permit doubling the number of locations therein, as addressable by the counter. Each selector position is associated with one particular format. The maximum number of counter positions is directly related to format length. Thus, even-numbered selector positions permit format control of twice the length of odd-numbered selector positions that formats permit.

The clear terminals, Cl1 and Cl2, for counter 12 are connected to output terminal $O_1$ of the PROM via a resistor R9. Thus, the counter will be cleared (reset to count state HEX 00), whenever a control bit is read out of the PROM and in the first bit position of the respective, addressed location. The counting input terminal $C_{Pl}$ is connected to the output of a NAND gate 24, one of its inputs being connected to a PC Board terminal for connection to the print controller 17.

This print controller is not shown in great detail. Suffice it to say that it controls the printing process, including vertical transport of the sheet to be printed on, the horizontal transport of the print head and the operation of the print head as to printing. In addition, the print controller receives a number of position inputs, all but one of which are not of immediate interest here. The one input of interest is a signal called L/LP; it represents the vertical transport operation in units of (pulses) vertical advance by line-spacing increments. This signal is developed by a so-called Leporello light barrier, but it will be appreciated that any suitable position-sensing device can be employed, signalling by way of pulses the passage of another line space. The connection to the terminal for the L/LP signal is biased to VCC via a resistor R14, holding this one input of gate 24 to the high VCC output as long as the L/LP signal line is forced down by the detection to the zero level.

The second input of gate 24 is connected to, or part of, an initiating circuit 16 which includes a NAND gate 23, having one input connected to the junction of a capacitor C2 and a registor R13. This RC circuit delays the effect of any signal applied to the other end of resistor R13. This other end is connected to the output of an inverter with delayed input. This inverter is simply realized by tying the inputs of a NAND or a NOR gate 21 and connecting this junction to the junction of an RC circuit (R12, C1) which, in turn, is connected between VCC and ground. All of these NAND gates are contained in a general logic chip of the SN 74 LS 132 type.

The output of gate 21 is connected to the chip-enable terminal CE via the resistor R11. The output of gate 21 is further connected to an inverter, realized by tied-together inputs of a NAND or a NOR gate 22 whose output controls the other input of gate 23. This gate 23 thus distinguishes between equal and unequal inputs in the sense that equal inputs are realized only for the delay interposed by operation of the RC circuit R13-C2.

The PC board is additionally provided with six terminals VCCP, VTP, FFP, EFP, CEP, and OVP, which are used only for changing the content of PROM 10. A programmer 15 will control the signal levels at these terminals. For reasons described more fully below, these lines are connected to protective circuitry which keeps any signal level applied by programmer 15 to these terminals ending in the letter P (or P-terminals) from the remainder of the the circuit.

First of all, there is a Schottky diode D1 which is interconnected between the VCCP terminal and the line or bus on the PC board distributing VCC to the various components. Thus, VCC can be provided to the PROM via diode D1 in a forward bias and by operation of the VCC bus on the Board, receiving "normal" VCC, generally, e.g., from the controller board. The voltage drop across diode D1 is at most 150 millivolts for maximum forward current consumption in the PROM, so that VCC is very little attenuated as far as the internal PROM operation is concerned. Schottky diode D1 is biased in the reverse whenever a higher-than-normal VCC value is applied via VCCP. Thus, diode D1 keeps this higher value from the VCC bus.

A circuit 14, being comprised of three Zener diodes Z1, Z2, and Z3, is interposed between the zero or ground line (OV) on the Board and the three connections 01-EFP, 02-FFP, and 03-VTP. The Zener diodes are respectively connected to these connections via resistors R8, R9, and R10. No protective circuitry is used on the CE-CEP line. The same is true as far as ground or zero volts are concerned. Ground can be applied to the Board either from the controller or from the programmer 15 when plugged into the −P terminals.

As far as data readout is concerned, the three output terminals 01, 02, 03 of PROM 10 are biased by resistors R5, R6, and R7, all having one terminal connected to the VCC bus. In addition, these three lines lead to four output terminals; the line from terminal 01 connects to the output terminal EF leading to the computer 16; another internal connection was mentioned above, the 01-terminal from PROM controls the erasing of counter 12. The line from terminal 02 connects to terminal FF which, in turn, connects to print controller 17. The third terminal, 03, connects to two board terminals, both designated VT, but one leading to controller 17 and the other one to computer 16.

OPERATION-INITIALIZATION

The first operation to be described can be termed a set-up or initialization of the line counter 12. Upon power-on, the controller, the printer, and the terminal for the VCC bus on the VFU Board receive +5 volts. This voltage is particularly applied to the two inputs of gate 21 via resistor R12 to capacitor C1. The voltage as so applied has a steep onset which is not immediately effective at gate 21. Thus, the two inputs of that gate remain temporarily at logic state 0; its output is high (because power is on at the chip).

The high output of gate 21 is applied on the chip-enable input terminal CE of PROM 10; in other words, the potential of that terminal is not held down at this point and the output terminals 01, 02, and 03 of the PROM cannot be activated by the PROM. Rather, these terminals can and will be pulled up to VCC via the three resistors R5, R6, and R7. It will be recalled that the particular output 01 is also connected to the clear inputs C11 and C12 which will go high, clearing line counter 12. Clearing or resetting the line counter means that its eight outputs Q0 to Q7 are held to a low or "0" level. This eight-bit counter 12, therefore, assumes a count state which, in hexadecimal, is "00."

The selection should be made earlier by setting switch 11 to a particular number, resulting in the inputting of the high-order bits to PROM. If the selection is an odd number, the highest-order output bit of counter 12 will be overridden by the selection. The selection makes available a group of locations in the PROM which have (a) the same high-order address code, but (b) differ by the low-order bits. Each such location has three bit cells, holding EF, FF, or VT bits; the significance thereof will be explained below. Presently, the three-bit location of the selected group, having the lowest lower-order address code (Hex 00), is accessed but not yet outputted to the terminals 01, 02, and 03 of the PROM because chip-enable ($\overline{CE}$) is high.

In the meantime, capacitor C1 charges via resistor R12; and as the voltage across the capacitor reaches a response level for gate 21 of 1.8 volts, the output thereof is pulled down to "0." Accordingly, chip-enable $\overline{CE}$ is pulled low and the PROM now applies the content of the selected and counteraddressed location to the three output terminals 01, 02, and 03.

It is now presumed that the lowest addressable location (Hex 00) of any of the selected groups holds a zero bit in the location outputted to PROM terminal 01. Thus, a zero or low-level signal is now applied to the clear terminals C11 and C12 of counter 12; the counter-erase and resetting is terminated. The location outputted to terminal 02 of the Hex-00 location holds a "1" bit for FF which has no significance at this point. The VT bit output to terminal 03 is also a zero bit.

The drop in signal level from high to low at the output of gate 21 is also transmitted to the other elements of circuit 13. In particular, the output of inverting gate 2 and one input of gate 3 go up without delay. The other input for gate 3 is up temporarily and remains so on account of the previous charge of capacitor C2. Thus, NOR gate 24 receives two high inputs, its output drops, and thus renders gate 24 responsive to line-tracking pulses L/LP.

This second input of gate 24 is biased high as long as the output of the line tracker does not actively pull the signal level L/LP to zero. The vertical transport of the printer is not yet activated so that line-counting pulses will not issue. On the other hand, the equality of two high inputs for gate 23 is a temporary condition only. As soon as capacitor C2 discharges sufficiently (the output of gate 21 is low), its voltage will traverse a response level of 0.8 V to, now, recognize a zero, and the output of gate 23 goes high again.

A change in signal level from low to high at the output of gate 23 restores the condition of two high inputs at gate 24 and its output drops. This drop from high to low by gate 24 is effective as a counter bit input and causes counter 12 to be incremented by one; its count state thus goes from Hex 00 to Hex 01. This completes the initialization.

It should be mentioned that any change of the output level of gate 24 from high to low increments counter 12 by one. This level change results from a condition in which not all of the inputs of gate 24 are high to a state in which both of them are high. This may be preceded by a temporary low state by operation of a line-count pulse L/LP, or by a temporary low output of gate 23. This latter condition exists on initialization, as just described. Programming is another case in which such count pulses are derived through gate 23.

NORMAL OPERATION

As was outlined above, the unit initializes itself upon start-up (power ON) to Hex address 01 on the $Q_0$-to-$Q_7$ output of counter 12. As a rule, the location for this address must always hold zero bits in all positions. This must hold true for any selection by selector 11. The user has previously selected his format and has adjusted switch 11 accordingly.

The user now places the form into the printer so that the feed position thereof locates exactly the print position of the printer. In case of an endless, or long, strip of preprinted forms, he just places the front edge into the requisite position in the printer.

Next, the user actuates the requisite switch on the printer controller (not shown) so that the computer operating the print head sends a signal FF via a signal path, which is not shown, to the controller. Signal FF operates the controller in order to start a line-wise transport of the form. Computer 16 will continue to issue line step pulses FF to controller 17 at a rate depending upon the print program. These line step pulses FF will cause the controller to step the paper-feed mechanism from one line to the next one, and in-between data may or may not issue to be printed in the respective line. The print and form-advance mechanism feeds back pulse L/LP, e.g., one per line of vertical advance; and counter 12 counts these pulses in order to keep track of the vertical advance. These L/LP pulses are also fed to the computer to control the data feed; we are not concerned here with the computer-printer cooperation, only with formatting and paper feeding in dependence upon selected form formats.

The state of counter 12 is transmitted to the PROM via the counter-output-to-PROM-address-bus connection (terminals $A_0$ to $A_7$), and the PROM feeds the content of these sequentially addressed locations to the output bus 01, 02, and 03.

It may now be assumed that, for the selected format, an EF bit is stored in the Hex address −48 (which is decimal 72). Thus, after an advance over 71 lines, output 01 of PROM 10 goes high. This EF bit is fed and applied to the clear counter terminals Cl1, Cl2 so that the counter is reset to Hex 00. Moreover, signal EF is applied to computer 16. The print program must be such that the computer has already stopped issuing data to be printed. The computer does not "know" when the end of a particular form has actually been reached on account of the autonomous, vertical paper-feed advance. The format signal EF now informs the computer of this fact. Since it is the computer that provides the stepwise control signals for stepping the vertical paper feed from line to line, signal EF informs the computer to cease issuing such line-stepping pulses.

The counter 12 resets to Hex 00, but this location in PROM 10 always holds an FF bit, and the 02 output of the PROM goes high. This signal is applied via resistor R9 to the controller which advances the form and paper feed by one more line. The total of 72 lines may equal the height of a DIN A4 format. The move to that next line causes a single pulse to be applied via L/LP to counter input CP1 so that the counter advances to Hex 01. The paper has now been advanced by exactly 72 lines.

Following the preceding operation, the computer will issue a signal VT which, again, causes the controller to advance the paper but without printing. It is assumed that forms are provided more or less endlessly on a long sheet or strip. The controller may be designed to cause the paper to advance continuously rather than on a line-by-line basis. The advance covers the space from the boundary between two forms to the first line to be printed on. As the counter 12 reaches a PROM address, accessing a location which holds a VT bit, this bit is transmitted to PROM output 03 which goes up, and the high signal is fed via resistor R10 to the printer controller in order to stop the continuous advance on the next line. This will be the next line, or, better, the first line to be printed upon on the next form.

The computer takes over thereafter and issues FF signals and print signals to obtain line-for-line printing. The paper advances until, again, the EF signal is produced (on count state Hex 48), etc., unless a different format has been selected in the meantime.

PROGRAMMING

In order to program the PROM, the external programming unit 15 is plugged into the terminals VCCP, VTP, FFP, EFP, CEP, and OVP. A particular plug will be provided just for plugging into these terminals. An irregular plug pin and socket arrangement may ensure that other units cannot be plugged in and, most importantly, that unit 15 cannot accidentally be plugged into other terminals of the VFU board. The programming unit applies a voltage of 8.75 V just to the VCC input of PROM 10. The Schottky diode D1 prevents positively this high potential from propagating into other VCC terminals and lines because it is reversely biased.

Programming proper, being preceded by plugging of unit 15 into the −P terminals of the VFU, proceeds by applying the requisite signals to be stored to the VTP, FFP, and EFP terminals, respectively, for transmission to the 01, 02, and 03 terminals of PROM 10. These signals have, for example, a level of 17 volts at, e.g., 300 mA, lasting for a duration specified for each of the units. These signals, if permitted to propagate elsewhere in the board, would destroy with certainly all of the circuit elements and components provided for normal operation at about 5 volts. That is to say, all of the TTL units and circuits as connected to, and participating and cooperating with and in, various IC's and discrete circuit elements would be destroyed. This applies in particular to all of the connections to the FF and VT lines. These elements, etc., are protected by the Zener diodes Z1, Z2, and Z3 of circuit 14. These diodes, in conjunction with resistors R8, R9, and R10 establish a voltage level of 3.9 volts at their respective Zener diode-resistor junctions. This way, all of the circuit elements, directly or indirectly connected to these junctions, are protected. Resistors R8, etc., have the added function of protecting the Zener diodes themselves. These resistors are dimensioned so that the signal transfer through them is unimpeded during normal operation. The resistors do not attenuate the output current from terminals 01, 02, and 03 to such an extent that the voltage drops across the resistors obscures the logic level of such a readout. On the other hand, the resistors are capable of limiting the current from the VTP, FFP, and EFP terminals to ground, through the Zener diodes, so that the current will not damage these diodes.

The data to be stored in PROM 10 are furnished by the Programmer 15 in a particular sequence commensurate with the different, addressable locations in the PROM. These data are accompanied by low-level, CEP-enabling signal pulses. These pulses are used to run counter 12. The pulses are fed to gates 22, 23, and 24 in order to provide a delayed operating signal edge. The L/LP terminal of gate 24 remains high during programming on account of the VCC bias. Normal VCC has to be applied to the FVU Board to run the counter and permit effectiveness of the selection by switch 11. Thus, counter imcrementing requires up and down swing of the other input of gate 24, and this is accomplished by the CEP signals, applied via gates 22 and 23. The delay resulting from the RC circuit R13,C2 meters the requisite pulse length that precedes the counter-operating upswing on gate 24, being a down-swing of the output thereof.

The programming sequence is repeated for as many different positions of selector swing 11 as are desired. The number in different selections represents the number of different forms and form formats. Counter 12 has eight stages of which the seven lower stages are used for format programming of odd-numbered selectors as per switch 11, being equivalent to a maximum line format of 128 lines. Even-numbered format selection permits the programming to encompass up to 256 lines.

The invention is not limited to the embodiments described above; but all changes and modifications thereof, not constituting departures from the spirit and scope of the invention, are intended to be included.

I claim:

1. In a control apparatus which includes an electrically programmable ROM, addressing means connected to addressing inputs of the ROM, and an output circuitry connected to output terminals of the ROM, the output circuitry, the addressing means, and the ROM operating at a particular voltage level for addressing and ROM content readout operation, there being a voltage supply bus for connection to a source of regular voltage supply and connected for feeding power to the output circuit and the addressing means, the combination comprising:
    a plurality of particular terminals not being used for regular readout and being electrically connected to the ROM in addition to said output circuitry;

a protective circuit for protection of the ROM and being connected to the said output circuit to limit the voltage level thereof for voltages applied via some of said particular terminals to the output terminals of the ROM;

one of the particular terminals provided for receiving a relatively high supply voltage, higher than the particular voltage level for purposes of reprogramming the ROM; and a Schottky diode connected to said one particular terminal to a voltage supply terminal of said ROM, and to said voltage supply bus for feeding the regular supply voltage as applied to the ROM via the diode and, thereby, to bias the diode in forward direction, the high supply voltage, upon being applied being appied to said one particular terminal, biasing the diode in the reverse.

2. In a control apparatus as in claim 1, said protective circuit including, for each output terminal, a series circuit of a Zener diode and a resistor having a common junction, there being as many series circuits and junctions as there are ROM output terminals, the junctions being connected to the output circuit, the resistors being respectively connected to the ROM output terminals, the Zener diodes being biased additionally, for limiting voltages at the junctions to a level below said relatively high supply voltage.

3. In a control apparatus as set forth in claim 1 or 2, wherein the addressing means includes a selector connected to a high-order address portion of the ROM, and a counter connected to a low-order address portion of the ROM, the counter having a reset input connected to one of the output terminals of the ROM and constituting part of the output circuit in that regard.

4. The combination as in claim 1 or 2, in combination with a printer which issues line advance pulses and wherein the addressing means includes a selector connected to a high-order address portion of the ROM and a counter connected to a low-order address portion of the ROM, the counter being connected for counting line advance pulses from the printer.

* * * * *